Figure 1:
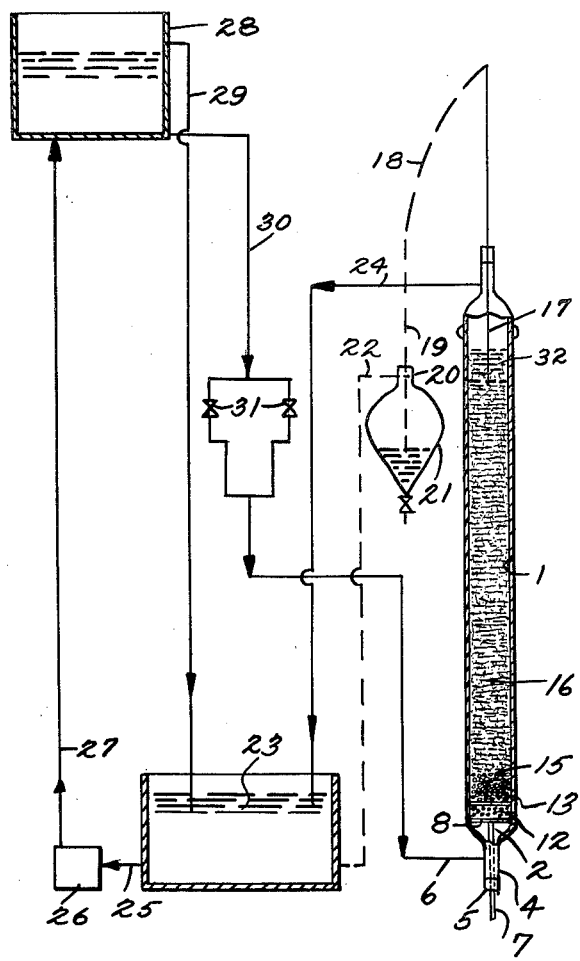

Jan. 30, 1962 R. C. CHUFFART 3,018,890
METHOD AND APPARATUS FOR OBTAINING POWDERS OF UNIFORM SIZE
Filed Jan. 7, 1959 2 Sheets-Sheet 1

INVENTOR
ROBERT CHARLES CHUFFART

BY Cushman, Darby & Cushman
ATTORNEYS

United States Patent Office 3,018,890
Patented Jan. 30, 1962

3,018,890
METHOD AND APPARATUS FOR OBTAINING POWDERS OF UNIFORM SIZE
Robert Charles Chuffart, Widnes, England, assignor to Imperial Chemical Industries Limited, London, England, a corporation of Great Britain
Filed Jan. 7, 1959, Ser. No. 785,519
Claims priority, application Great Britain Jan. 15, 1958
12 Claims. (Cl. 209—158)

The present invention is concerned with a method of obtaining powders of uniform size and is particularly concerned with a method of obtaining at least one fraction of particles of limited size distribution from a powder composed of particles of a wide size distribution.

Industry and commerce often require powders of a highly uniform size distribution and these are generally obtained by, for example, such operations as sieving, elutriating, repeated sedimentation. It is also known for instance that by introducing a slurry of a crystalline mixture of large crystals of the gamma isomer of benzene hexachloride and fine crystals of any of the other isomers of benzene hexachloride into the top portion of a vertical vessel through which an inert liquid medium is moving upwardly that by fluid classification the large crystals will separate from the mixture and sink to and collect at the bottom of the vessel and the fine crystals will be removed from the top portion of the vessel by the liquid leaving at the top of the vessel.

The object of the present invention is to provide a process which is based on the hydro-dynamic properties of a particle to permit at least one fraction of particles of limited size distribution to be obtained within more precise and sharper defined limits than has heretofore been possible from a powder composed of particles of a wide size distribution as for instance from a powder composed of particles having a mean diameter of 200 microns.

It has now been found that the separation of the particles of a powder into fractions, each made up of particles of a very constant hydraulic diameter, can be carried out by maintaining the powder to be fractionated in a fluidised state by a suitable liquid which is circulated upwardly at an appropriate rate through said powder in a vertical elongated vessel of substantially uniform internal cross section provided that the distribution of the liquid at the bottom of the fluidised powder is such that the vertical velocity of the liquid is uniform at any point of the cross sectional area of the vessel, the flow is such that no preferential streams of liquid are formed in the fluidised powder, and the particles of the fluidised powder are free from air bubbles, and provided that said desired distribution of the liquid is due to having passed it upwardly in such manner through a layer of particles in said vessel which are below and of greater resistance to flow of said liquid than the first mentioned particles as to maintain this layer in a fluidised state.

According to the present invention the method of obtaining at least one fraction composed of particles of limited size distribution from a powder composed of particles having a greater size distribution comprises continuously recirculating in a substantially vertical wall-enclosed elongated zone, preferably of substantially uniform cross section and preferably of substantially uniform circular cross section, a liquid in which said particles at least do not dissolve to any extent and which liquid is of lower density than said particles, passing said liquid upwardly through a fluidised bed in the lower portion of said zone of particles of greater resistance to flow of said liquid than the largest particles in said powder, permitting the resulting liquid of substantially uniform upward velocity throughout the cross sectional area of said zone to pass upwardly through a fluidised suspension of said powder formed by and in said liquid in said zone and above said fluidised bed, and taking off from the upper portion of said fluidised suspension in said zone a predetermined fractional amount of said liquid in which the upper limit of particle size for a particular fraction of particle size distribution is not exceeded.

If desired said predetermined fractional amount is taken off from a progressively lower level in the upper portion of the fluidised suspension in said zone.

If the method of the invention is to be carried out in a continuous manner the powder composed of particles of a wide size distribution is continuously added to the liquid which is being continuously recirculated and a predetermined fractional amount of said liquid is continuously taken off from at least one preselected level from said upper portion of said fluidised suspension and also another predetermined fractional amount from at least one preselected level from a lower portion of said fluidised suspension. If desired, several predetermined fractional amounts can be taken off simultaneously from several levels in the upper portion and from several levels in the lower portion of said fluidised suspension.

Preferably in the carrying out of the method of the invention it is desirable that log $_{10}t_1$ and log$_{10}t_2$, referring respectively to the material to be separated in the fluidised suspension and to the heavier particles forming the fluidised bed, should obey the relation $$\log t_1 + 4 > \log t_2 > \log t_1 + 1$$

In this relation, $t_1$ and $t_2$ are respectively defined by the relations:

$$t_1 = \frac{g(\sigma_1 - \rho)\rho d_1^3}{\eta^2}; \quad t_2 = \frac{g(\sigma_2 - \rho)\rho d_2^3}{\eta^2}$$

where:

$g$ = acceleration due to gravity, 981 cm./secfi$^2$
$\sigma_1$ = density of the particles to be fractionated, g./cc.
$\sigma_2$ = density of the heavy particles i.e. the beads in the fluidised bed of particles employed to distribute the liquid recirculating through the aforesaid wall-enclosed elongated zone, g./cc.
$\rho$ = density of the liquid, g./cc.
$d_1$ = diameter of the heaviest of the spheres to be separated, cm.
$d_2$ = mean diameter of the heavy spheres forming the distributor, cm.
$\eta$ = dynamic viscosity of the liquid, poises.

The diameter of a particle having a mean diameter greater than 40 microns is obtained by measuring the constant velocity of its fall in a liquid of known physical characteristics and applying Stokes' law. This liquid should be such that Reynolds number calculated from this observed velocity and the relevant physical characteristics of the liquid is not higher than 0.1.

For particles having a mean diameter less than 40 microns it is desirable to determine the diameter by the miscroscopic method described by G. Lowrie Fairs in the Journal of the Microscopical Society 1951, vol. LXXI, pages 209–222.

We thus have the preferred relationship which is to exist between the particles to be used in the fluidised bed acting as a distributor for the recirculating liquid and the particles of the powder to be fractionated. It is also desirable that the liquid should be such that $$\log_{10}t_1 = \log_{10}\left[\frac{g(\sigma_1 - \rho)\rho d_1^3}{\eta^2}\right]$$

is smaller than 2 and preferably smaller than 1 and that attention should be given to the voidage under which fractionation proceeds. By the term voidage is meant the ratio of the volume of liquid in the fluidised suspension to the total volume of the fluidised suspension. The higher the voidage the more effective will be the fractionation but the volume required to handle a given weight of particles increases with the voidage. This volume can be obtained either by having a fluidised suspension of great height and a small cross sectional area or by using a wider but shorter fluidised suspension. The former leads to a much more effective fractionation than the latter, although the latter may be found useful to perform a rough separation when the particles of the powder to be treated differ widely in size, so that a very large amount of the powder has to be treated in order to obtain a required quantity of powder having particles of the desired size distribution. Generally, it is an advantage to keep the ratio height/diameter of the fluidised suspension at a figure which is not less than 20 and the voidage of the suspension above 0.7.

Said substantially vertical wall-enclosed elongated zone of substantially uniform cross section is preferably a vertical long tube of substantially uniform internal diameter. This tube is preferably provided at its lower end with a narrow feed pipe and a gauze to support said bed, when at rest, of particles of greater resistance to flow of the recirculating liquid than the largest particles in said powder. Preferably between said gauze and feed pipe there is a perforated plate whose holes are outside the projection of the narrow pipe on to the plate to disperse the flow of liquid introduced in said bed through said narrow feed pipe. For the same purpose it may be desirable to have below said gauze some spherical particles made of a polished material lighter than the liquid. To make sure of having uniform flow it is also desirable to use a head tank fed by a pump instead of connecting the pressure side of the pump directly to the bed of fluidised particles. In this way the pulsation effects of the pump are suppressed. It is also desirable to have a large reserve of liquid so as to suppress sharp rises in temperature.

When handling particles smaller than 100 microns, or when the method of the invention is used to classify powders having a rough surface, it is important to eliminate any air bubbles adhering to the particles. To make sure of this, it is preferred to proceed as follows. After preparing a suspension of particles in the liquid to be used any air is removed from the particles by reducing the pressure on the suspension and the suspension thus treated is then introduced into the vertical long tube full of liquid by a feed pipe in such manner that the particles have no possible direct contact with the atmosphere.

After having loaded the vertical tube with the two types of particles, preferably defined as above, it is necessary at the start to expand the bed and the suspension preferably until the highest possible voidage compatible with the height of the apparatus is reached. This releases the fine particles present in the material and allows them to reach the top layers of the fluidised suspension. The flow is then progressively reduced to that corresponding to the mean voidage under which it is intended to carry out the operation. When steady conditions are reached, i.e. when the feed being kept constant, the level of the fluidised suspension remains constant, a predetermined fractional amount of said liquid can be taken off, for exampe, by introducing a sampling tube of small diameter into the suspension until its bottom end is slightly lower than the upper plane limiting the fluidisation zone and proceeding as follows. By suction first and siphoning later the top layer of particles is removed with some liquid, and the particles are separated from the liquid by any suitable means, i.e. decantation. The sampling tube has to be progressively lowered in small steps until the particles collected have reached the upper limit in size decided for the fraction corncerned. Instead of operating by hand a continuous device can be used which governs the rate of lowering of the sampling tube collecting the particles from the top layers of the suspension. The fractionation ends when all the particles to be fractionated have been removed.

Care should be taken that the flow circulating through the sampling tube is only a small fraction of the total flow circulating through the bed and the fluidised suspension. Said small fraction can be for instance less than 0.1.

The embodiment of the invention as just described is essentially discontinuous as the apparatus has to be periodically reloaded. The method of the invention, however, can be made continuous if the particles to be separated are introduced with the liquid, and the finished products are removed from two or more preselected levels. In this embodiment of the invention, however, some "fines" will be always present in the heaviest fractions in limited amounts.

Figure 2:
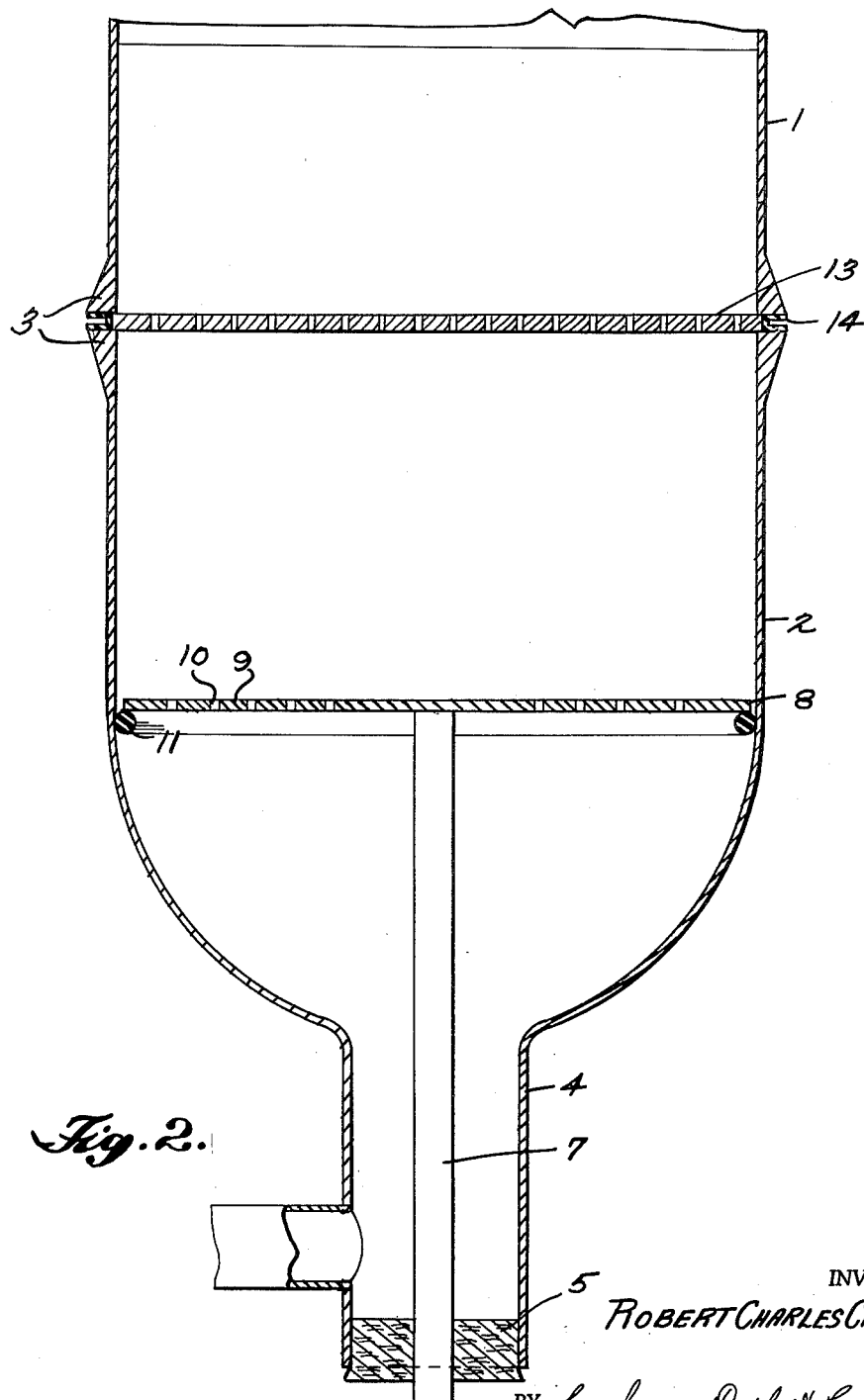

The invention will be described by way of example with reference to the diagrammatic drawings accompanying the provisional specification wherein FIGURE 1 illustrates one form of apparatus suitable for the carrying out of the method of the invention and FIGURE 2 is an enlarged view of the lower portion of the vertical tube showing its lower attachments.

In the drawings the vertical tube 1 is 3 inches internal diameter and 60 inches long and is joined to another tube 2 by buttress-joints 3 which are tied with bolts (not shown). Tube 2 ends in a narrow portion 4 which is closed by a bung 5 and has leading into it a feed pipe 6. Passing through the bung 5 is a rod 7 supporting a perforated plate 8 which has six holes symmetrically disposed in the annulus limited by circumference 9 and also along circumference 10. 11 is a rubber ring of circular cross-section. 12 are spheres made of polythene and 3 mm. in diameter. 13 is a gauze held in position by gaskets 14. 15 is the fluidised bed of particles to distribute the liquid recirculating through the apparatus. 16 is the fluidised suspension of particles of the powder to be treated. 17 is the sampling tube which is connected by a rubber tube 18 to a tube 19 which passes through a bung 20 closing a settler 21. 22 is a pipe in the top portion of the settler 21 to lead liquid back to reservoir 23 of large fluid capacity. 24 is a pipe at the top of the vertical tube 1 to lead liquid back to said reservoir 23. Liquid is pumped out of the reservoir 23 through pipe 25 by pump 26 into pipe 27 leading into a head tank 28. 29 is a constant level overflow pipe in head tank 28 leading into the reservoir 23. 30 is a pipe from head tank 28 branching and leading by way of two feed control taps 31 to the feed pipe 6. In vertical tube 1, 32 is liquid above the fluidised suspension 16.

To carry out a powder fractionation, given weights of the distributor particles $d_2$ and the powder are suspended in some of the liquid, the suspension so obtained is freed from air bubbles and is then introduced into the tube 1, partially filled with liquid, through a feed-pipe not shown) which dips under the level of the liquid.

The liquid is then circulated and the feed from the head tank 28 to the resulting fluidised bed 15 and fluidised suspension 16 is so adjusted that, under steady conditions, the level of the fluidised suspension 16 nearly reaches the top of the vessel 1. When the powder to be handled consists of particles of widely different diameters, it is usually necessary to filter the liquid leaving the fluidised suspension 16 through a suitable cloth before returning it to the reservoir 23. When the very fine material has been eliminated, the fractionation can be started by filling the sampling tube 17 with liquid and then lowering it until it reaches the top level of the fluidised suspension 16. Particles start to accumulate in the settler 21 if the sampling tube 17 is lowered through small distances at regular intervals of time. The cuts are chosen according to the amount of solid material accumulated in the settler 21. When the collection of one given fraction is completed, the settler 21 is disconnected, emptied of its contents, washed with some of the liuid and is then connected again to the rubber tube 18 so as to obtain the next fraction.

The following examples illustrate how the invention can be carried into effect.

EXAMPLE I

The vertical tube 1 is loaded with 1000 g. of "Ballotini" (glass beads) "175" microns so as to form the fluidised bed 15 and 1000 g. of "Ballotini" said to be "40" microns mean diameter so as to form the fluidised suspension 16. The term Ballotini is used to describe small glass spheres of the kind used for example in making reflecting paints. They are made by melting glass in an oxy-acetylene flame, and cooling the droplets of molten glass before they can coalesce together. The liquid in the head tank 28 is water at 20° C.

The characteristics of the solids and the liquid are:

$\sigma_1 = 2.48$ g./cm.$^3$
$\sigma_2 = 2.87$ g./cm.$^3$
$\rho = 1$ g./cm.$^3$
$\eta = 0.01$ poise
$d_1 = 69 (10)^{-4}$ cm. $= 69$ microns
$d_2 = 175 (10)^{-4}$ cm. $= 175$ microns therefore $\log t_1 = 0.68$
$\log t_2 = 2.0$ The voidage is maintained at over 0.9 and 20 fractions are collected. Photographs of the enlarged particles belonging to each fraction show that the diameter of the particles belonging to the first fraction is almost identical and equal to 30 microns, whilst the particles belonging to the last fractions are of 70 microns in diameter. The diameters of the particles belonging to the intermediate fractions are uniform and increase progressively with the number of the fraction.

EXAMPLE II

The vertical tube 1 is loaded with 1000 g. of "Ballotini" "805" microns mean diameter so as to form the fluidised bed 15 and 3600 g. of "Ballotini" "175" microns so as to form the fluidised suspension 16.

An aqueous sugar solution, dynamic viscosity 0.064 poises at 20° C. is used as the liquid in the head tank 28 and the mean voidage for the bed 15 and the suspension 16 is 0.75.

The characteristics of the solids and the liquid are:

$\sigma_1 = 2.87$ g./cm.$^3$
$\sigma_2 = 2.901$ g./cm.$^3$
$\rho = 1.18$ g./cm.$^3$
$\eta = 6.43 (10)^{-2}$ poise
$d_1 = 178 (10)^{-4}$ cm. $= 178$ microns
$d_2 = 805 (10)^{-4}$ cm. $= 805$ microns therefore $\log t_1 = 0.42$
$\log t_2 = 2.4$ 24 fractions are collected and the mean diameter of the particles belonging to one given fraction is determined by sedimentation, measuring the velocity of fall of 10 individual particles belonging to that fraction and using the arithmetical mean velocity to calculate the mean diameter.

For two fractions, the calculated diameter for each of the 10 individual particles is given to show the possible variations in diameter around the mean value.

*Fractionation of "Ballotini" "175" microns*

| Fraction Number | Calculated Mean Diameter (microns) | Calculated diameter for each of the 10 individual particles (microns) |
| --- | --- | --- |
| 1 | 156 | |
| 8 | 164.5 | |
| 11 | 167.5 | |
| 12 | 174.8 | 172; 173; 173; 176; 177; 178; 179; 174; 174; 177 |
| 13 | 173.5 | |
| 18 | 182 | 189; 181; 184; 189; 182; 173; 180; 183; 180; 180 |
| 20 | 184 | |

It can be seen that the variation in diameter of particles belonging to one given fraction is generally less than 5% of the calculated mean diameter.

EXAMPLE III

The vertical tube 1 is loaded with 1000 g. of "Ballotini" 880 microns mean diameter to form the fluidised bed 15. The fluidised suspension 16 is formed from 1000 g. of an impure common salt which is obtained by evaporating in a continuous forced circulation crystalliser a raw brine containing 25% by weight of pure salt and having a calcium content (mainly as calcium sulphate) of 0.13%.

An aqueous solution of salt and gypsum, saturated in respect of both these salts at 20° C., is used in the head tank 28.

By microscopic examination of the impure common salt, before fractionation, it is seen that the calcium sulphate therein is present as needles of various sizes, the longer ones being 100 microns in length and that the salt particles range from 100 to 400 microns.

Owing to the presence in the impure common salt to be treated of extremely small particles of calcium sulphate a filter bag is fitted on pipe 24, above reservoir 23. The fluidised suspension 16 is maintained at a voidage of 0.8.

Ten fractions are collected. The wet material of fractions 1, 5 and 10 is analysed for calcium and moisture content. Fractions 5 and 10 are also analysed for occluded calcium.

The analytical results are recorded in the following table.

| Fraction No. | Ca (g.)/100 g. of wet salt | Ca (g.) in the 15 g. of solution per 100 g. wet salt | Total Ca in 85 g. of dry salt | Total Ca in dry salt (percent) | Calcium occluded (percent) |
| --- | --- | --- | --- | --- | --- |
| 1 | 0.048 | 0.02 | 0.028 | 0.033 | |
| 5 | 0.039 | 0.02 | 0.019 | 0.022 | 0.0085 |
| 10 | 0.036 | 0.02 | 0.016 | 0.019 | 0.0089 |

As the impure salt which is subjected to fractionation in the aforesaid manner is obtained by evaporating in the aforementioned kind of crystalliser a brine in which the ratio of salt to calcium is 25/0.13 it is thus seen that there is a removal of 95% of the calcium initially present. Nearly half of the 5% of calcium originally present which is still in the thus purified salt is occluded therewith as calcium sulphate and so cannot be removed by the method of the present invention.

What I claim is:

1. Apparatus for obtaining at least one fraction of particles of limited size distribution from a powder composed of particles having a greater size distribution comprising a substantially vertical wall-enclosed elongated tube having substantially uniform cross-sectioned upper part and a reduced cross-section lower part, fluid inlet means for introducing liquid into said reduced cross-section lower part, a liquid permeable support within said tube, in the lower end of said uniform cross-sectioned upper section and disposed transverse to the axis thereof, a bed of particles on said liquid-permeable support to be fluidized by upwardly flowing liquid in said tube and to regulate the uniformity of liquid velocity in said upper uniform cross-section part, a perforated plate within said tube, positioned beneath said liquid-permeable support, above said fluid inlet means, and extending transverse to the axis of said tube, the perforations of said plate being radially outside the projection of the inlet means onto said perforated plate, exit means for withdrawing said liquid and a limited portion of the powder to be segregated from the upper portion of the elongated tube and means for separating the solid matter from the liquid withdrawn.

2. A method of segregating at least one fraction of particles of limited size distribution from a powder composed of particles having a greater size distribution in which a continuous stream of liquid, in which said particles are substantially insoluble, passes upwardly through a suspension of said powder, said liquid having a lower density than said particles, said method comprising continuously passing said liquid upwardly through a bed of particles having greater resistance to liquid flow than the largest of said particles to be segregated with sufficient velocity to fluidize the bed of particles and provide substantially uniform flow velocity above said bed, confining the flowing liquid and said bed to a vertically-extending zone of substantially uniform cross-section, suspending said powder in said upwardly passing liquid above said bed to form a fluidized suspension thereof, whereby the particles to be segregated are classified to have a downwardly extending gradient of increasing particle size within said suspension, and withdrawing a predetermined fractional amount of said suspension containing particles of predetermined particle size and particle size distribution from the upper portion thereof.

3. A method as claimed in claim 2 wherein the liquid is such that $$\log_{10} t_1 = \log_{10} \left[ \frac{g(\sigma_1 - \rho)\rho d_1^3}{\eta^2} \right]$$

is smaller than 2, the terms $t_1$, $g$, $\sigma_1$, $\rho$, $d_1$ and $\eta$ representing respectively $t_1$=referring to the material to be separated in the fluidized suspension
$g$=acceleration due to gravity, 981 cm./sec.$^2$
$\sigma_1$=density of the particles to be fractionated, g./cc.
$\rho$=density of the liquid, g./cc.
$d_1$=mean diameter of the heaviest of the spheres to be separated (or the diameter of the sphere of equivalent volume), cm.
$\eta$=dynamic viscosity of the liquid, poises.

4. A method as claimed in claim 2 wherein $$\log_{10} t_1 = \log_{10} \left[ \frac{g(\sigma_1 - \rho)\rho d_1^3}{\eta^2} \right]$$

is smaller than 1.

5. A method of segregating as set forth in claim 2 including withdrawing additional fractional amounts of said suspension from progressively lower portions thereof.

6. A method of segregating as set forth in claim 2 including withdrawing an additional fractional amount of said suspension from the lower portion thereof, separating the liquid from the withdrawn suspension and recirculating the separated liquid by passing it upwardly through said bed.

7. A method of segregating as set forth in claim 2 including passing said liquid upwardly through a layer of polished spherical particles lighter than the recirculating liquid below a supporting gauze before passing it upwardly through the particles to be separated.

8. A method of segregating as set forth in claim 2 in which said liquid is passed upwardly into said bed at constant pressure.

9. A method of segregating as set forth in claim 2 including removing gas from the surface of said particles to be segregated before suspending them in said liquid.

10. A method of segregating at least one fraction of particles of limited size distribution from a powder composed of particles having a greater size distribution in which a continuous stream of liquid, in which said particles are substantially insoluble, passes upwardly through a suspension of said powder, said liquid having a lower density than said particles, said method comprising continuously passing said liquid upwardly through a bed of particles having greater resistance to liquid flow than the largest of said particles to be segregated with sufficient velocity to fluidize the bed of particles and provide substantially uniform flow velocity above said bed, confining the flowing liquid and said bed to a vertically-extending zone of substantially uniform circular cross-section, suspending said powder in said upwardly passing liquid above said bed to form a fluidized suspension thereof, whereby the particles to be segregated are classified to have a downwardly extending gradient of increasing particle size within said suspension, and withdrawing a predetermined fractional amount of said suspension containing particles of predetermined particle size and particle size distribution from the upper portion thereof.

11. A method as claimed in claim 2 wherein the ratio height/diameter of the fluidized suspension is kept at a figure which is not less than 20 and the voidage of the suspension above 0.7.

12. A method as claimed in claim 2 in which $\log_{10} t_1$ and $\log_{10} t_2$, obey the logarithmic relationship of $\log t_1 + 4 > \log t_2 > \log t_1 + 1$ wherein $t_1$ refers to the material to be separated in the fluidized suspension and $t_2$ refers to the heavier particles forming the fluidized bed, $t_1$ and $t_2$ being defined by the following relations:

$$t_1 = \frac{g(\sigma_1 - \rho)\rho d_1^3}{\eta^2}; \quad t_2 = \frac{g(\sigma_2 - \rho)\rho d_2^3}{\eta^2}$$

where:

$g$=acceleration due to gravity, 981 cm./sec.$^2$
$\sigma_1$=density of the particles to be fractionated, g./cc.
$\sigma_2$=density of the heavy particles of the fluidized bed, g./cc.
$\rho$=density of the liquid, g./cc.
$d_1$=mean diameter of the heaviest of the spheres to be separated (or the diameter of the sphere of equivalent volume), cm.
$d_2$=mean diameter of the heavy spheres forming the distributor (or the diameter of the sphere of equivalent volume), cm.
$\eta$=dynamic viscosity of the liquid, poises.

References Cited in the file of this patent

UNITED STATES PATENTS

| | | |
|---|---|---|
| 1,291,137 | Reed | Jan. 14, 1919 |
| 2,124,343 | Burroughs | July 19, 1938 |
| 2,666,526 | Odell | Jan. 19, 1954 |
| 2,774,661 | White | Dec. 18, 1956 |